2,831,823

VULCANIZABLE RUBBER LATICES AND PROCESS OF VULCANIZATION

William S. Murray, Wilmington, Del., assignor to E. I. du Pont de Nemours and Company, Wilmington, Del., a corporation of Delaware No Drawing. Application June 23, 1954
Serial No. 438,868

6 Claims. (Cl. 260—29.7)

This invention relates to the vulcanization of butadiene elastomers, and more particularly to the rapid vulcanization of the articles of manufacture made directly from latices of rubber or other elastomers that are vulcanizable with sulfur.

Many rubber articles, particularly those consisting of thin layers of complicated structure, such as gloves, are most conveniently made by coagulating latex, containing dispersed vulcanizing ingredients, upon a suitable form or mold and then vulcanizing by heat and finally removing the finished article from the form. Because less work is done on the rubber in these manipulations, it is sometimes possible to use very rapidly acting ultra-accelerators such as sodium dibutyl dithiocarbamate or zinc diethyl dithiocarbamate, which would cause prohibitive scorching in the compounding of solid rubber.

Since the molds upon which the latex is deposited are often both expensive and easily damaged by heat, it is desirable to cure the latex film on them at a relatively low temperature, often 100° C., and for as short a time as possible, in order to get high production with few molds. The ultra-accelerators are therefore particularly useful in this type of work. It is found, however, that most of these ultra-accelerators are too active to be used in cases where the compound latex is not used immediately, since they cause partial curing of the rubber while still dispersed as latex at ordinary temperatures. This pre-curing leads to products having unsatisfactory physical properties such as lowered tensile strength and poor tear resistance of the cured films, and poor extensibility and other handling properties of the wet films. An added requirement for an accelerator to be used in latex which must be stored in the compounded state, therefore, is that it should cause no significant amount of vulcanization at ordinary temperatures during the period which the compounded latex must be kept, which is often several months in actual practice.

The ideal accelerator for use in latex from which dip-molded articles are to be produced should therefore have the somewhat contradictory properties of being without action at 25° C. but at higher temperatures should be very active in accelerating vulcanization, such as at 70° C. to 100° C. Accelerators approaching the above ideal have been diligently sought for since they would make possible a great advance in the manufacture of dipped goods from latex.

While in U. S. Patent 2,283,336 of May 19, 1942, a large number of metal salts of dithiocarbamates are disclosed as secondary accelerators for 2-mercapto-thiazolines used as the primary accelerators in the vulcanization of rubber, apparently a distinctly different effect is obtained when the dithiocarbamates as a class are used as primary accelerators in the vulcanization of elastomers in the absence of other accelerators when sulfur is employed as the vulcanizing agent, for in general it has been found, as will be hereinafter further illustrated, that the various metal salts of alkyl dithiocarbamates are not satisfactory when used as the sole accelerator in the vulcanization of elastomer latices cured with sulfur.

It is therefore an object of the present invention to provide an improved process for vulcanizing articles produced from butadiene elastomer latices in which sulfur is employed as the vulcanizing agent, which will not cause pre-curing of the elastomer at ordinary temperatures but which will give a rapid and satisfactory cure at temperatures which are satisfactory for curing articles prepared from elastomer latices. It is a more specific object of the invention to provide a process for vulcanizing articles prepared from rubber latex in which sulfur is used as the vulcanizing agent and in which a vulcanization accelerator is employed which does not cause a pre-curing of the rubber latex on storage but which gives a satisfactory cure at 100° C. in a relatively short time.

I have found that cadmium di-n-propyl dithiocarbamate and cadmium diallyl dithiocarbamate rapidly accelerate the vulcanization of articles prepared from rubber latices or latices of other elastomers normally cured by sulfur, such as GR–S, at temperatures of 100° C. while causing no detrimental pre-curing of the latex on storage at ordinary room temperatures for extended periods of time.

From 0.2 to 2.0 parts of the cadmium di-n-propyl dithiocarbamate or cadmium diallyl dithiocarbamate are employed per 100 parts of the elastomer to be vulcanized. Ordinarily, from 0.5 to 1.0 part of the accelerator per 100 parts of elastomer will be found to give satisfactory results and amounts within this range are preferred.

Although the cadmium di-n-propyl dithiocarbamate is preferred because it is more readily available than the cadmium diallyl dithiocarbamate, both compounds are found to give very satisfactory results, as illustrated in the following examples, and both vary materially in their effectiveness from relatively close homologs and isomers. These accelerators are incorporated in the latex by the conventional methods. The latex contains sulfur and, if desired, other compounding ingredients such as zinc oxide, antioxidants, pigments, etc. Because of the exceptionally good cures given by the above accelerators and because, unlike most powerful accelerators, they show little or no pre-curing, it is usually unnecessary and undesirable to use other very active accelerators in the formulations, but, on the other hand, the accelerators of the present invention may be used to advantage in combination with less active ones.

Because of the rapid cures obtained, it is possible to reduce the amounts of vulcanizing ingredients, such as sulfur and zinc oxide, normally used in the vulcanization of these sulfur vulcanizable elastomers. Films of unusual transparency may be obtained.

Curing takes place at a practical rate at temperatures somewhat above 70° C. At 100° C. a full cure is usually obtained in from about 15 to 30 minutes, and at 120° C. in about 5 minutes.

While natural rubber latex and butadiene-styrene (GR–S) latex are used in the following examples to illustrate the invention, it is to be understood that the present invention is applicable in the acceleration of the vulcanization of articles prepared from any sulfur vulcanizable elastomer including GR–N, "Buna N," "Buna S," etc.

The following examples are given to more specifically illustrate the invention. The parts used are by weight.

EXAMPLES

The accelerators used in the following examples were compared in the latex formulation:

| | Parts by weight |
|---|---|
| Rubber, in natural latex | 100 |
| Zinc oxide | 2 |
| Sulfur | 1.5 |
| Casein | 1 |
| Sodium salts of sulfate mono-esters of mixed higher fatty acids | 0.5 |
| Accelerator | See tables |

The accelerator was added in the form of a dispersion made by ball-milling 8 parts with 1 part of casein and 3 parts of sodium dinaphthylmethane sulfonate in 88 parts of water.

The films for testing were made by dipping a tube in a coagulating solution of calcium nitrate in methanol, then into the latex for 3 minutes, dipping the deposit of latex into the coagulant again, washing thoroughly and drying.

In order to evaluate quantitatively the tendency of accelerators to cause pre-curing of rubber latex at low temperatures as well as their effectiveness at curing temperatures, it is customary to determine the physical properties (modulus at various elongations, tensile strength, etc.) for sheets formed from the latex and heated at 70° C. (to show pre-curing) and at 100° C. or other practical curing temperature, for several different curing times. The figures obtained at 70° C. should be low, indicating no cure or only slight cure under these conditions and hence predicting little or no cure in the compounded latex held at room temperature for considerable periods, while the figures at 100° C. for modulus and tensile strength should be high, corresponding to a full cure. The values should also preferably vary little for the different curing times, showing that a full cure is rapidly reached and that longer curing times do not cause over-curing.

In Table I accelerators are compared by this method. The first three examples illustrate the present invention through the use of cadmium di-n-propyl and diallyl dithiocarbamate. The remaining examples in Table I give comparisons of the compounds of the present invention and two compounds (5 and 6) currently sold as vulcanization accelerators. Also, the table shows the distinctly different effect of alkyl dithiocarbamates closely related to those applicant has found give unexpected results.

*Table I.—Comparison of accelerators*

| Example No. | Dithiocarbamate | Cure, Min./° C. | $M_{600}$ | $M_{800}$ | Tensile |
|---|---|---|---|---|---|
| 1 | Cadmium di-n-propyl, 0.52 part. | 60/70 | 800 | 2,100 | 3,150 |
|  |  | 15/100 | 1,475 | 4,400 | 5,500 |
|  |  | 30/100 | 1,250 | 3,900 | 5,100 |
| 2 | Cadmium di-n-propyl, 0.52 part. (duplicate run). | 60/70 | 800 | 1,900 | 3,400 |
|  |  | 15/100 | 1,300 | 3,800 | 5,800 |
|  |  | 30/100 | 1,200 | 3,950 | 5,200 |
| 3 | Cadmium diallyl, 0.52 part. | 60/70 | 850 | 2,250 | 3,450 |
|  |  | 15/100 | 1,450 | 4,400 | 5,450 |
|  |  | 30/100 | 1,250 | 3,700 | 5,250 |
| 4 | Cadmium di-iso-propyl, 0.52. | 60/70 | 600 | 1,500 | 2,300 |
|  |  | 15/100 | 500 | 1,300 | 2,500 |
|  |  | 30/100 | 550 | 1,400 | 2,450 |
| 5 | Zinc diethyl, 0.41 | 60/70 | 1,100 | 3,000 | 5,150 |
|  |  | 15/100 | 1,100 | 3,400 | 5,250 |
|  |  | 30/100 | 1,000 | 3,200 | 4,400 |
| 6 | Zinc dibenzyl, 0.68 | 60/70 | 675 | 1,650 | 2,650 |
|  |  | 15/100 | 1,000 | 2,800 | 4,700 |
|  |  | 30/100 | 1,000 | 2,800 | 5,000 |
| 7 | Cadmium dimethyl, 0.40 | 60/70 | 775 | 2,050 | 2,500 |
|  |  | 15/100 | 1,000 | 2,925 | 4,400 |
|  |  | 30/100 | 975 | 2,850 | 4,400 |
| 8 | Cadmium diethyl, 0.46 | 60/70 | 625 | 1,500 | 2,200 |
|  |  | 15/100 | 725 | 2,100 | 3,500 |
|  |  | 30/100 | 1,150 | 3,500 | 5,500 |
| 9 | Cadmium di-n-butyl, 0.50. | 60/70 |  | 2,975 | 5,350 |
|  |  | 15/100 |  | 3,400 | 5,500 |
|  |  | 30/100 |  | 1,825 | 4,675 |
| 10 | Cadmium pentamethylene, 0.50. | 60/70 |  | 775 | 1,675 |
|  |  | 15/100 |  | 850 | 2,450 |
|  |  | 30/100 |  | 1,400 | 2,450 |
| 11 | Cadmium ethyl m-tolyl, 0.60. | 60/70 | 650 | 1,500 | 2,500 |
|  |  | 15/100 | 725 | 1,700 | 2,500 |
|  |  | 30/100 | 850 | 2,250 | 3,500 |
| 12 | Zinc di-n-butyl, 0.50 | 60/70 |  | 3,275 | 5,450 |
|  |  | 15/100 |  | 3,425 | 5,100 |
|  |  | 30/100 |  | 3,425 | 5,475 |
| 13 | Zinc diallyl, 0.50 | 60/70 |  | 3,325 | 3,700 |
|  |  | 15/100 |  | 3,025 | 4,325 |
|  |  | 30/100 |  | 3,075 | 3,975 |

The amounts of accelerators used in the above formulations were chosen in most cases so as to be chemically equivalent to 0.41 part of zinc diethyl dithiocarbamate. In some cases 0.5 part was used instead. The results obtained in the latter case do not differ significantly for the compounds tested from those obtained with an equivalent amount.

It will be obvious to those familiar with the vulcanization of rubber deposited from latex that the di-n-propyl and diallyl dithiocarbamates of Examples 1, 2 and 3 are much superior to the other closely related dithiocarbamate accelerators included in Table I for comparison. Thus, Examples 5 and 6 show the action of two commercial accelerators designed for use in latex and representing the best available on the market. It will be noted that the zinc diethyl dithiocarbamate gives high figures for the 70° cure, indicating a serious tendency to pre-cure, and that the figures for the cures at 100°, although satisfactory, are not as high as for the accelerators of the present invention. The zinc dibenzyl dithiocarbamate is satisfactory as to pre-curing but gives low figures for the 100° cures, the $M_{800}$ values being 1000 or more pounds lower than for the preferred cadmium compounds. Thus the present invention is a great improvement over the prior art. The other examples show how slight structural modifications in the compounds of the present invention greatly reduce the value as accelerators for latex. Thus, merely changing n-propyl to isopropyl (Example 4) or to the next lower homologs, ethyl and methyl, Examples 8 and 7, gives much poorer cures. On the other hand, passing to the next higher homolog, n-butyl, Example 9, gives serious pre-curing at 70° C. and over-curing for the longer cure at 100° C. Cures with the closely related cadmium pentamethylene dithiocarbamate, Example 10, and ethyl m-tolyl dithiocarbamate, Example 11, were also poor. Two other zinc dithiocarbamates, Examples 12 and 13, resemble the diethyl compound, Examples 5, in pre-curing badly and not giving superior cures at 100° C. Thus, the two compounds of the present invention are greatly superior to the dithiocarbamates offered commercially for curing latex and also to all closely related isomers, homologs, and analogs and exhibit a long step toward ideal accelerators for this purpose.

The accelerators of the present invention have no deleterious effect upon the aging of vulcanized rubber films containing them. Latices containing them, when stabilized in the ordinary manner, are stable toward coagulation as a result of aging, mechanical agitation, etc.

The substantial absence of pre-curing during the storage of latex containing cadmium di-n-propyl dithiocarbamate is shown directly in the examples under Table II, in comparison with the two latex accelerators now on the market. Films were made from the compounded latices used in Examples 1, 5 and 6 (except that 0.5 part of accelerator was used in each case) after storage for 0 and 28 days at 75° F. (23.8° C.) and air-dried at 75° F. and 50% relative humidity for 2 days. The modulus at 600 and 800% elongation and the tensile strength were then determined on these films which had received no curing.

*Table II—Effect of storage*

| Example No. | Dithiocarbamate | Storage, days | $M_{600}$ | $M_{800}$ | Tensile |
|---|---|---|---|---|---|
| 14 | Cadmium di-n-propyl | 0 | 125 | 275 | 550 |
|  |  | 28 | 75 | 250 | 1,150 |
| 15 | Cadmium di-n-propyl (another lot). | 0 | 125 | 275 | 875 |
|  |  | 28 | 100 | 350 | 1,150 |
| 16 | Zinc diethyl | 0 | 125 | 325 | 925 |
|  |  | 28 | 275 | 1,000 | 1,625 |
| 17 | Zinc dibenzyl | 0 | 125 | 275 | 725 |
|  |  |  | 125 | 375 | 1,475 |

The cadmium diallyl dithiocarbamate gives substantially the same results when substituted in these examples for the cadmium di-n-propyl dithiocarbamate.

These results confirm and extend the information on pre-curing given in Examples 1, 5 and 6 of Table I. The latices containing cadmium dipropyl and zinc dibenzyl dithiocarbamates show no significant change after storage for 28 days, but the zinc diethyl dithiocarbamates cause considerable curing under these conditions. Note especially the effect upon the 800% modulus.

A latex of a synthetic elastomer known in the trade as GR–S, which is a copolymer of butadiene and styrene, was compounded as follows to compare the action of cadmium di-n-propyl dithiocarbamate with a known commercial accelerator, sodium dibutyl dithiocarbamate.

| | Parts |
|---|---|
| GR–S latex (GR–S 2000 latex) | 100 |
| Zinc oxide | 4 |
| Sulfur | 2 |
| Casein | 1 |
| Polyethylene oxide dispersing agent | 2 |
| Butyraldehyde-aniline antioxidant | 1 |
| Ethylene diamine | 1.5 |
| Accelerator | 3 |

Films from this GR–S latex, prepared and tested as described for the preparation of the films used in Table I, gave the following values:

| Example No. | Dithiocarbamate | Cure, Min./°C. | $M_{500}$ | Tensile |
|---|---|---|---|---|
| 18 | Cadmium di-n-propyl | 15/100 | 525 | 2,450 |
| | | 30/100 | 875 | 2,500 |
| | | 60/100 | 1,025 | 2,425 |
| | | 5/121 | 1,275 | 2,550 |
| 19 | Sodium dibutyl | 15/100 | 500 | 1,675 |
| | | 30/100 | 625 | 1,650 |
| | | 60/100 | 650 | 1,675 |
| | | 5/121 | 525 | 2,100 |

The substantial absence of pre-curing of the GR–S during storage of the latex compounded with cadmium di-n-propyl dithiocarbamate, in comparison with the pre-curing under the same conditions of latex compounded with sodium dibutyl dithiocarbamate, was shown by aging the latices at 75° F. (23.8° C.) and then preparing and testing films. The cure was for 5 minutes at 250° F. (121° C.).

| Example No. | Dithiocarbamate | Tensile Strength | |
|---|---|---|---|
| | | Original | Latex Aged 14 Days |
| 20 | Cadmium di-n-propyl | 2,550 | 2,475 |
| 21 | Sodium dibutyl | 2,100 | 675 |

Thus, the accelerator used in the latex of Example 21 gave a very low tensile on aging, because of pre-curing, while that of Example 20, embodying the present invention, was little changed. The cadmium diallyl dithiocarbamate shows similar improvement with the previously used vulcanization accelerators when employed in the curing of GR–S rubber.

I claim:

1. A sulfur curable compounded elastomer latex of the group consisting of rubber, butadiene-styrene and butadiene-acrylonitrile copolymer latices containing sulfur as the vulcanizing agent and as an accelerator for the vulcanization from 0.2 to 2.0 parts, per 100 parts of elastomer, of a cadmium dialkyl dithiocarbamate of the group consisting of cadmium di-n-propyl dithiocarbamate and cadmium diallyl dithiocarbamate.

2. Rubber latex containing sulfur as the vulcanizing agent and as an accelerator for the vulcanization from 0.5 to 1.0 part, per 100 parts of elastomer, of a cadmium dialkyl dithiocarbamate of the group consisting of cadmium di-n-propyl dithiocarbamate and cadmium diallyl dithiocarbamate.

3. Butadiene-styrene elastomer latex containing sulfur as the vulcanizing agent and as an accelerator for the vulcanization from 0.5 to 1.0 part, per 100 parts of elastomer, of a cadmium dialkyl dithiocarbamate of the group consisting of cadmium di-n-propyl dithiocarbamate and cadmium diallyl dithiocarbamate.

4. A process of vulcanizing articles prepared from elastomer latices of the group consisting of rubber, butadiene-styrene and butadiene-acrylonitrile copolymer latices in which the elastomer is vulcanizable by means of sulfur, which comprises incorporating in the compounded elastomer latex in addition to the sulfur as the vulcanizing agent from 0.2 to 2.0 parts, per 100 parts of elastomer, of a cadmium dialkyl dithiocarbamate of the group consisting of cadmium di-n-propyl dithiocarbamate and cadmium diallyl dithiocarbamate, depositing the elastomer solids from said latex and heating to temperatures of about 100° C. to effect vulcanization.

5. A process of vulcanizing articles prepared from rubber latices, which comprises incorporating in the compounded rubber latex in addition to the sulfur as the vulcanizing agent, from 0.2 to 2.0 parts, per 100 parts of rubber, of a cadmium dialkyl dithiocarbamate of the group consisting of cadmium di-n-propyl dithiocarbamate and cadmium diallyl dithiocarbamate, depositing the rubber solids from said latex and heating to temperatures of about 100° C. to effect vulcanization.

6. A process of vulcanizing articles prepared from butadiene-styrene elastomer latex which comprises incorporating in the compounded latex in addition to the sulfur as the vulcanizing agent from 0.2 to 2.0 parts, per 100 parts of elastomer latex, of a cadmium dialkyl dithiocarbamate of the group consisting of cadmium di-n-propyl dithiocarbamate and cadmium diallyl dithiocarbamate, depositing the butadiene-styrene elastomer solids from said latex and heating to temperatures of about 100° C. to effect vulcanization.

References Cited in the file of this patent

UNITED STATES PATENTS

| 1,938,651 | Williams | Dec. 12, 1933 |
| 2,172,463 | Anderson | Sept. 12, 1939 |
| 2,283,334 | Neal et al. | May 19, 1942 |
| 2,304,800 | Cramer | Dec. 15, 1942 |